G. Huntington.
Upsetting Tires.
N° 48,245.
Patented Jun. 13, 1865.
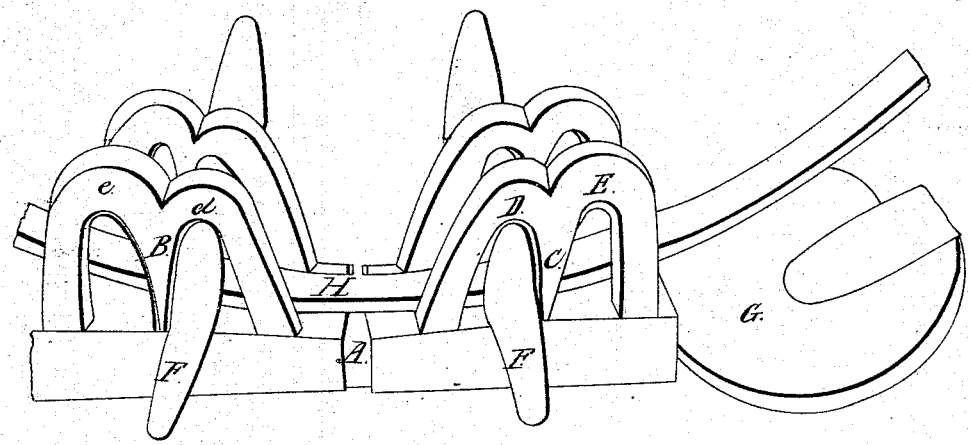
Witnesses;
Andrew J. Beach,
James O. Neill.
Inventor;
Gideon Huntington

UNITED STATES PATENT OFFICE.

GIDEON HUNTINGTON, OF NORWICHVILLE, CANADA WEST.

IMPROVED MACHINE FOR UPSETTING WAGON-TIRES.

Specification forming part of Letters Patent No. 48,245, dated June 13, 1865; antedated June 7, 1865.

*To all whom it may concern:*

Be it known that I, GIDEON HUNTINGTON, a citizen of the United States, but now a resident of Norwichville, Canada West, have invented a new and Improved Machine for the Upsetting of Tires of the Wheels of Carriages, Wagons, and other Vehicles; and I do hereby declare that the following is a full, clear, and exact description of the construction and operation of the same, reference being had to the annexed drawing, making a part of this specification.

It consists of a platform, on one end of which is a stationary head cast in one and the same piece with the platform, and on the other end are guides at the sides, on which the movable head is made to slide. These heads are each provided with two loops or beveled mortises on either side, and placed sufficiently far apart to allow of any ordinary tire to be laid between them. In these loops or mortises are fitted two keys or wedges, and so arranged that the upper edges of them shall turn upon the upper part of the loops, as upon a hinge, while the lower edges have the full width of the loops in which to play.

Upon the above-mentioned platform, and behind the movable head, is an eccentric wheel, with a mortise to receive a lever, and by means of which wheel and lever the necessary power is obtained to drive the movable head along the platform toward the stationary head.

The action of this machine is as follows: The movable head C is drawn back along the platform A until it comes in contact with the eccentric wheel G, the said wheel having been so placed as to present its smallest diameter toward the head. When the tire to be upset (a section of which is represented in the drawing by H) is first heated, then placed between the loops of the two heads B and C; the keys or wedges F F are then pushed into the loops E $d$ in such a manner that while one edge fits into the upper part of said loops the other edge presses down upon the inner surface of the tire at the front corner of said loops, thus holding the tire firmly where it is placed. The eccentric wheel G is then turned by means of the lever above mentioned, and the movable head C is driven toward the stationary head B, and the tire is thus shortened or upset to the desired size as it is held by the keys or wedges F F, as above described.

If it is desired to upset a straight piece of iron, the keys are placed in the loops E $e$. It will thus be seen that the greater amount of pressure there is exerted upon the movable head C during the operation of its being driven toward the stationary head B the more tightly the keys are forced to act, as the tendency of the lower edges of them is to move from the front to the back corner of said loops at their lowest or widest part, and thus they become what I claim for them—self-tightening or self-acting.

What I claim as my invention, and desire to secure by Letters Patent, is—

1. The self-acting keys or wedges, acting in the loops or beveled mortises, as above described.

2. The combination of the keys and mortises with the various parts of this machine, and for the purposes herein set forth.

GIDEON HUNTINGTON.

In presence of—
E. W. COREY,
JOSEPH MOSES.